United States Patent [19]

Geurts

[11] 4,167,977
[45] Sep. 18, 1979

[54] TOGGLE LINK TRIP MECHANISM
[75] Inventor: Cletus J. Geurts, Gibson City, Ill.
[73] Assignee: Geurts Inc., Minneapolis, Minn.
[21] Appl. No.: 807,829
[22] Filed: Jun. 20, 1977
[51] Int. Cl.² ............................................. A01B 61/04
[52] U.S. Cl. ................................................. 172/267
[58] Field of Search ............... 172/261, 264, 265, 266, 172/267, 268, 270, 271, 734, 743; 74/520, 521, 522

[56] References Cited
U.S. PATENT DOCUMENTS

| | | | |
|---|---|---|---|
| 1,682,373 | 8/1928 | Davis | 74/520 |
| 2,444,324 | 6/1948 | Allen et al. | 74/522 UX |
| 3,483,930 | 12/1969 | Detwiller et al. | 172/267 |
| 3,910,354 | 10/1975 | Johnson et al. | 172/267 |
| 4,068,723 | 1/1978 | Quanbeck | 172/267 |

*Primary Examiner*—Richard T. Stouffer
*Attorney, Agent, or Firm*—Burd, Braddock & Bartz

[57] ABSTRACT

An earthworking unit having a toggle trip mechanism for holding an earthworking tool in an earthworking position and allowing the tool to move upwardly to a release position. The toggle trip mechanism has a pair of links pivotally connected with an eccentric pin. One link is connected to a pivoting mount held in a normal position with a flexure bar. The other link is connected to a standard carrying the earthworking tool. A control arm connected to the pin and a control rod is operable to rotate the eccentric pin 91 to adjust the overall length of the toggle links.

28 Claims, 8 Drawing Figures

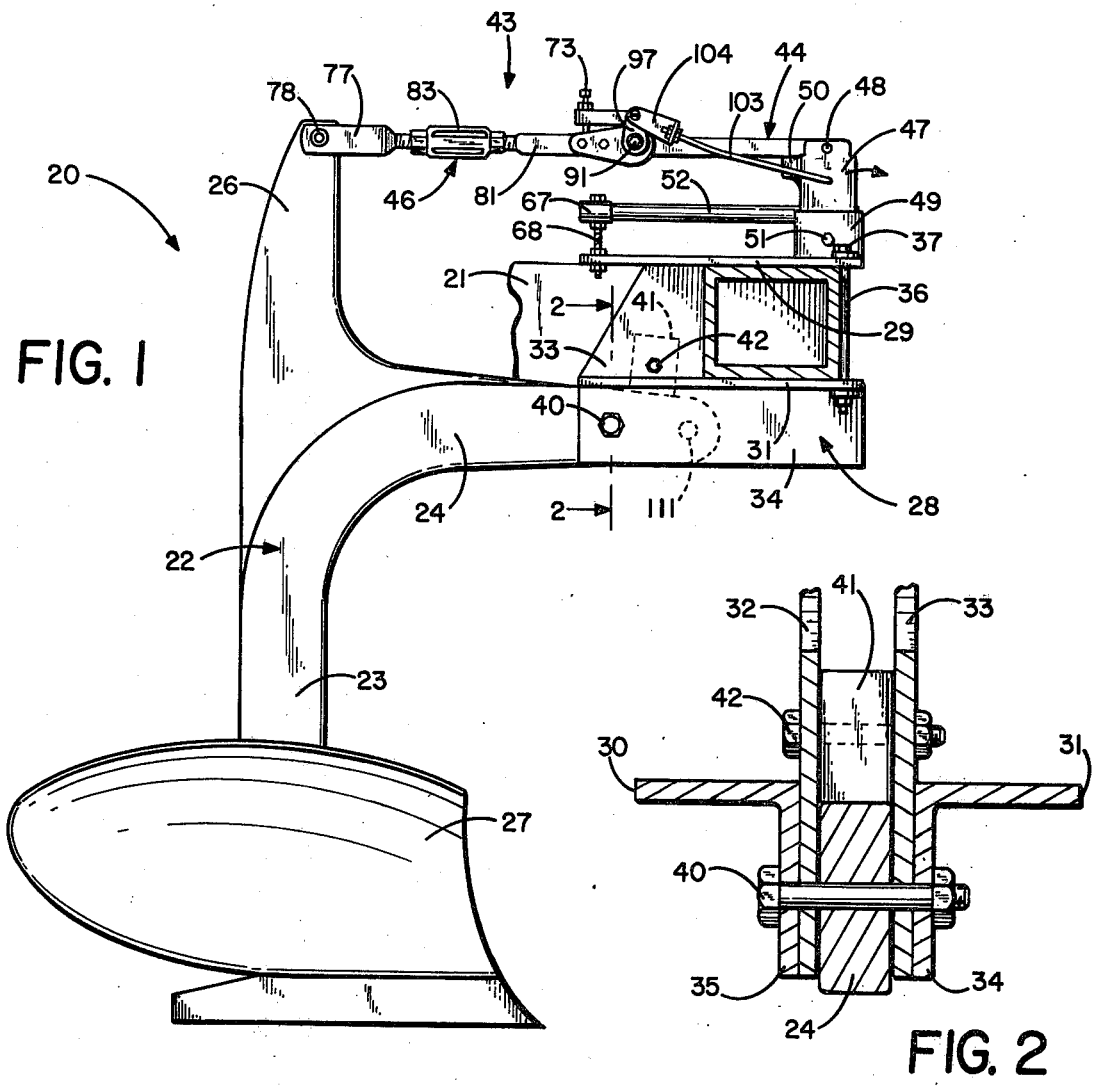
FIG. 1
FIG. 2
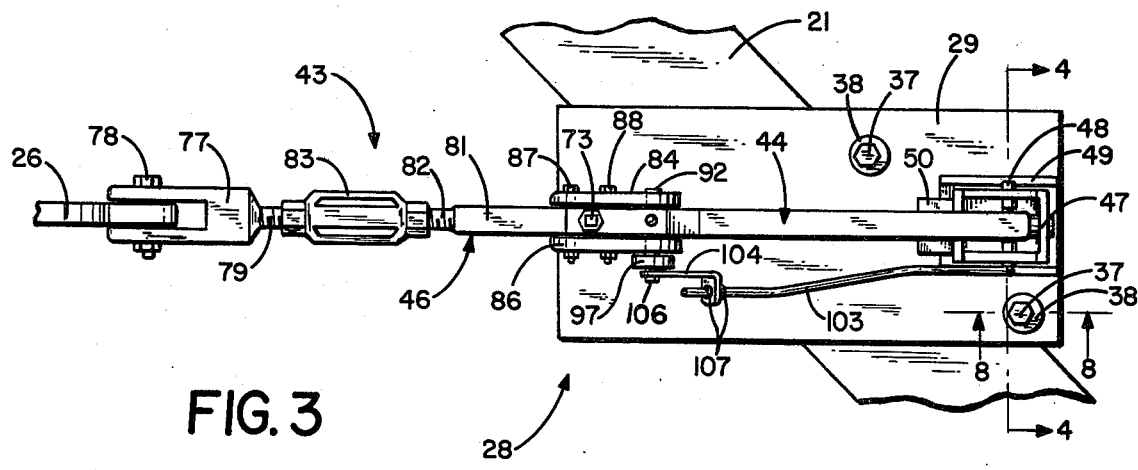
FIG. 3

4,167,977

TOGGLE LINK TRIP MECHANISM

BACKGROUND OF INVENTION

Moldboard plows and chisel plows have been provided with toggle link trip mechanisms that are biased with springs to over center positions to hold earthworking tools in groundworking positions. These toggle link trip mechanisms have a pair of links pivoted together with a pivot pin. Another pivot pin connects one of the links to a fixed structure mounted on the frame of the implement. The other link is pivoted to a standard carrying the earthworking tool. Springs connected to the links bias the links to an over center position. These trip mechanisms are used to allow the earthworking tool to swing rearwardly and upwardly when an immovable object is encountered by the tool. Adjustable stops have been used to adjust the amount of over center distance of the pivotal connection between the links. The prior art toggle links do not adjust the overall length of the linkage. They also do not have reliable adjustments whereby the amount of force necessary to trip the linkage can be varied, and accurately controlled.

PRIOR ART

Spring biased toggle linkages for resetting earthworking tools are located in the U.S. Patent and Trademark Office Classification Class 172, Subclass 267. The following U.S. patents are examples of prior art directed to toggle trip mechanisms for earthworking tools: U.S. Pat. Nos. 2,405,980; 2,944,613; 3,321,027; 3,483,930; 3,550,690; 3,901,326; and 3,972,374.

SUMMARY OF INVENTION

The invention is directed to a toggle trip mechanism for an earthworking implement and the earthworking implement equipped with the toggle trip mechanism. An earthworking unit is mountable on a beam of an implement with a mount assembly. The mount assembly includes clamp structure which permits the mount assembly to be attached to the beam without the use of holes in the beam. A standard connected to an earthworking tool such as a moldboard plow bottom is pivotally connected to the mount assembly for movement from a down earthworking position to an up release or trip position. The toggle link mechanism connected to the mount and standard is operable to releasably hold the earthworking tool in its ground working position. When the earthworking tool strikes a hard obstruction, such as a rock, the tool will trip or fold the toggle link mechanism and move upwardly and rearwardly over the obstruction.

The toggle link mechanism has first and second rigid links that are pivotally connected together. The first link is pivotally connected to a movable mount pivotally mounted on a base attached to the mount assembly. The second link is connected to the standard. The second link includes a turnbuckle which is adjustable to change the length of the toggle link mechanism. An eccentric pivot pin pivotally connects adjacent ends of the links together. A control means connects the eccentric pivot pin to the mount. The control means has an adjustable member operable to rotate the eccentric pivot pin to change the overall length of the toggle links to eliminate excessive or sloppy movement of the earthworking tool when the toggle links are in the down over center position. Pivotal movement of the mount against the biasing force of the flexible bar caused by force on the links due to the tool hitting an obstruction moves eccentric pin upwardly past its center position. Once the center line of the pin moves past the straight line location, the links will fold and the tool is free to move up and rearwardly over the obstruction.

An object of the invention is to provide a toggle trip mechanism having a flexure bar operable to hold an earthworking tool in a working position and to allow the tool to move from the working position to clear an obstruction, as a rock. Another object of the invention is to provide a toggle link mechanism with means operable to vary the length of the linkage to adjust the working position of an earthworking tool. Yet another object of the invention is to provide a toggle trip mechanism with an eccentric pivot control that is adjustable to change the overall length of a pair of toggle links to eliminate excessive or sloppy movement of an earthworking tool when the toggle links are in a down over center position. These and other objects and advantages of the invention are set out in the following detailed description of an embodiment of the invention.

IN THE DRAWINGS

FIG. 1 is a side elevational view of a plow bottom unit mounted on a plow beam;

FIG. 2 is an enlarged sectional view taken along the line 2—2 of FIG. 1;

FIG. 3 is an enlarged top plan view of FIG. 1;

DESCRIPTION OF PREFERRED EMBODIMENT

Figure 7:
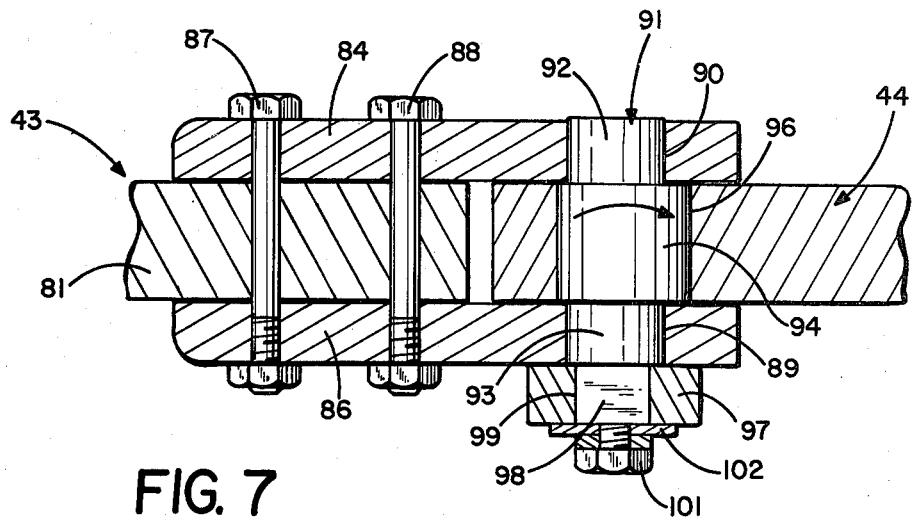
FIG. 7 is an enlarged sectional view taken along the lines 7—7 of FIG. 5.

Referring to FIG. 1, there is shown a plow bottom unit indicated generally at 20 mounted on a plow beam or frame member 21. A complete plow can have a plurality of plow bottom units mounted on beam 21. Examples of moldboard plows having a plurality of plow bottoms with over center toggle trip mechanisms are shown by Geurts in U.S. Pat. No. 3,901,326 and Johnson in U.S. Pat. No. 3,910,354.

Plow bottom unit 21 has a standard indicated generally at 22. Standard 22 is made of heavy structural material, such as cast steel, and has a first downwardly directed section 23, a second forwardly directed section 24 and an upright arm 26 extended upwardly from the top of first section 22. Moldboard plow structure 27 is attached to the lower end of section 23. Other types of earthworking tools, as subsoiling tools and chisel plow tools, can be attached to standard section 23.

A mount assembly indicated generally at 28 attaches a forward section 24 to beam 21. Mount assembly 28 has a top plate 29 located in engagement with the top of beam 21. A pair of heavy right angle members 30 and 31 are located in engagement with the bottom of beam 21 below plate 29. A pair of upright plate members 32 and 33 are secured to the upright portions of right angle members 30 and 31 and are attached to plate 29. Members 32 and 33 engage the backside of beam 21. Right angle members 30 and 31 have downwardly directed flanges 34 and 35 secured to the lower parts of plate members 32 and 33. The top plate 29 and right angle members 30 and 31 are clamped onto beam 21 with a pair of upright bolts 36. Bolts 36 extend through holes in eccentric washers 38.

Figure 8:
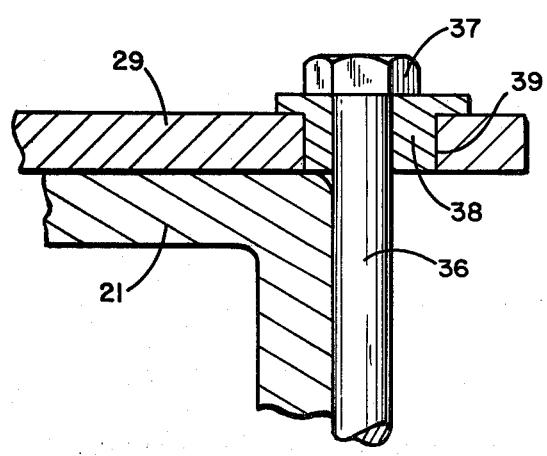
FIG. 8 is an enlarged sectional view taken along the line 8—8 of FIG. 3.

As shown in FIG. 8, eccentric washer 38 is located in a hole 39 in top plate 29. A similar eccentric washer is located in a hole in the right angle member 31. The head 37 of bolt 36 bears on washer 38. The nut on the lower end of bolt 36 bears on a similar eccentric washer. Eccentric washers 38 are rotated to clamp the mount assembly on beam 21. Rotation of the eccentric washers 38 moves the bolt 36 in a sideways or horizontal direction providing a horizontal clamping force on the beam 21. Nuts on bolts 36 are tightened to provide a vertical clamping of plate 29 and angle members 30 and 31 on beam 21. The mount assembly 28 is attached to beam 21 without the need to drill holes in the beam. Also, the eccentric washers 38 and bolts 36 compensate for mill tolerances of beam 21. An example of an eccentrically clamped arrangement is shown by Geurts in U.S. Pat. No. 3,901,326.

Returning to FIGS. 1 and 2, a pivot member or pin 40 extends through transversely aligned holes in flanges 34 and 35 and plates 32 and 33, and a hole in the forward section 24 of standard 22 to pivotally mount the standard on angle members 32 and 33. Standard 22 pivots about a generally transverse horizontal axis. Opposite sides of the forward end of standard 24 are located in close proximity to the inside surfaces of plates 32 and 33 to guide the standard end 24 and provide the standard 22 with lateral stability. Side plates and track and roller guides can be used to guide the standard. An example of this structure is disclosed in U.S. Pat. No. 3,901,326.

FIGS. 1–5 show the plow bottom unit 20 in its normal or earthworking position. Forward section 24 bears against a stop block 41. As shown in FIG. 2, block 41 is located between plates 32 and 33 and is carried on a bolt 42 secured to plates 32 and 33. Stop block 41 has an off center or eccentric hole for accommodating bolt 42. This allows the block to be rotated to the different positions, thereby changing the stop position of standard 22 with respect to block 41. This permits the angle of the moldboard plow structure 27 to be adjusted.

Figure 5:
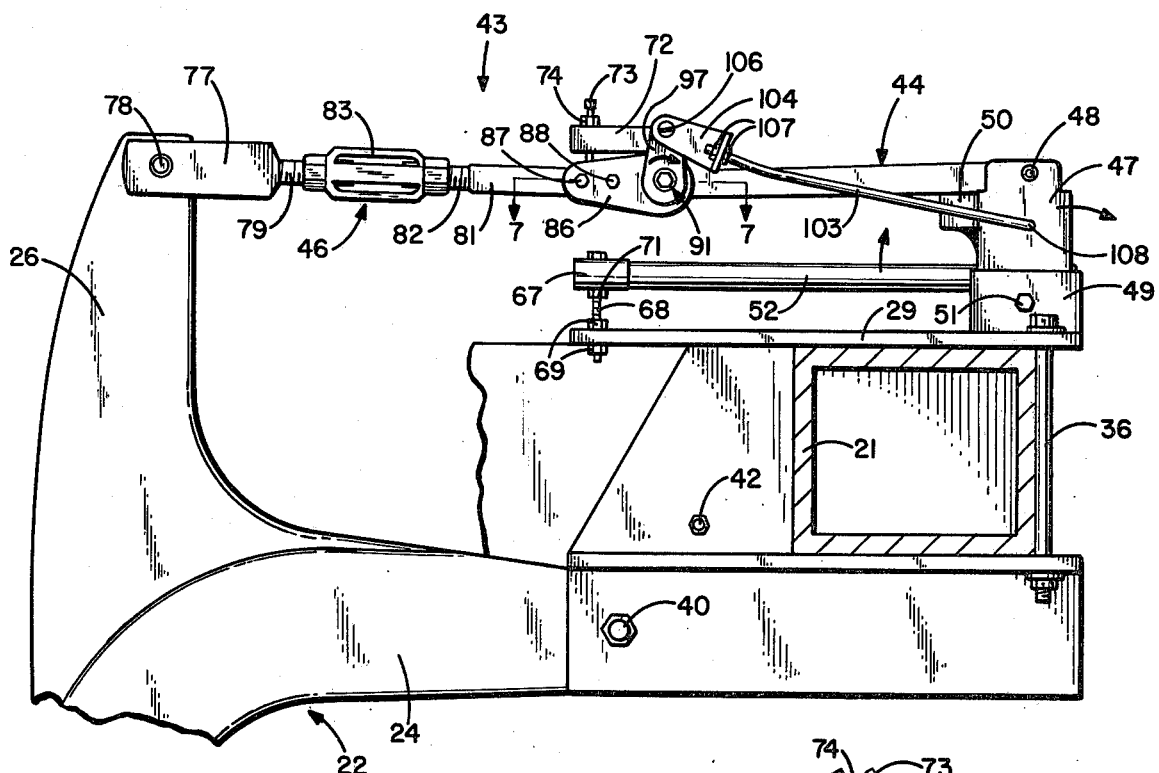
FIG. 5 is a side elevational view of the toggle trip mechanism holding the plow bottom in the ground working position.

Standard 22 is held in its normal ground working position with a toggle link trip mechanism indicated generally at 43. Trip mechanism 43 has a first link 44 pivotally connected to a second link 46. A mount 47 carries a transverse pin 48 that pivotally connects the forward end of link 44 to mount 47. A transverse stop or lip 50 projects rearwardly from mount 47 below link 44. As shown in FIGS. 1 and 5, a portion of the lower side of link 44 is immediately below link 44 when the toggle linkage 43 is in the over center down position. Mount 47 is pivotally mounted on a fixed base 49 with a transverse pivot pin 51. Base 49 is secured to the top of plate 29. This can be done with nut and bolt assemblies or base 49 can be welded to the top of plate 29. Mount 47 is held in an upright or first position by a rearwardly directed control or flexure bar 52. Bar 52 can be an elongated flexure member, spring plate, or spring rod.

Figure 4:
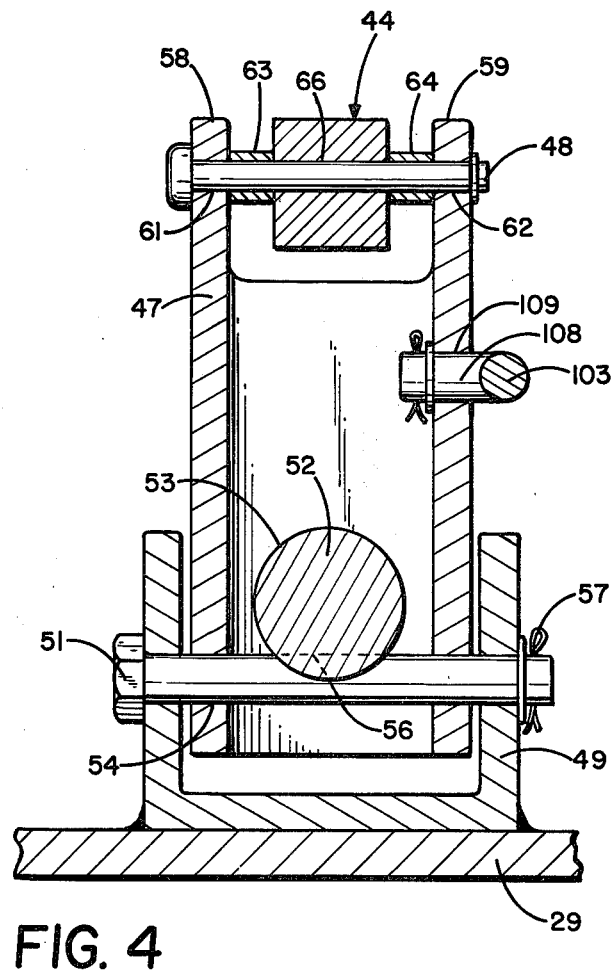
FIG. 4 is an enlarged sectional view taken along line 4—4 of FIG. 3.

Referring to FIG. 4, mount 47 has end members with horizontal bores 53 accommodating the forward end of control bar 52. Transverse holes 54 in mount 47 intersects bore 53. Pin 51 is located in bore 54 and extends through a side hole 56 in control bar 52. Pin 51 pivotally supports mount 47 on the upright side members of base 49 and holds control bar 52 in assembled relation with mount 47. A fastener 57, as a cotter pin, holds pin 51 on mount 49.

Mount 47 has two upwardly directed flanges or ears 58 and 59. Ear 58 has a hole 61 aligned with a hole 62 in ear 59. Pivot pin 48 extends through holes 61 and 62. A pair of sleeves 63 and 64 mounted on pin 48 center first link 44 between ears 58 and 59. Link 44 has a transverse hold 66 accommodating pin 48.

As shown in FIGS. 1 and 5, the rear end of control bar 52 fits in a sleeve 67. A bolt 68 secures sleeve 67 to plate 29. Nuts 69 threaded on bolt 68 adjustably positions bolt 68 on plate 29. Second nut 71 clamps sleeve 67 to the head of bolt 68. An eye bolt can replace sleeve 67 and bolt 68. Control bar 52 is a spring steel rod that serves as a flexure bar or spring. Bar 52 yieldably holds mount 67 in its upright position. The position of bar 52 is adjusted by adjusting the elevation of sleeve 67. This is done by adjusting nut 69 on bolt 68. To increase the tripping force needed to trip link 46 is shortened and toggle bar 52 is lowered to increase the gap or space between link 44 and lip 50. Bar 52 must flex a greater amount before lip 50 raises link 44 a distance sufficient to move pin 92 past the center position.

First link 44 has a rear end 72 offset upwardly and extended over a portion of the second link 46. End 72 carries an adjusting stop bolt 73. Bolt 73 is threaded into a nut 74 welded to the top of end 72. Bolt 73 has a lower end 76 adapted to engage a portion of link 43 to control the over center down position of links 44 and 46. Bolt 73 is adjustable to vary the amount of over center that the center line of the link connecting pin 91 is held when the plow bottom 27 is in its normal working position.

Second link 46 has a first member or clevis 77 pivotally mounted to the upper arm 26 of standard 22 with a transverse pivot pin 78. Clevis 77 has a forwardly directed threaded rod 79. Link 46 has a second member 81 carrying a threaded rod 82. A turnbuckle 83 is threaded onto the rod 79 and 82. Turnbuckle 83 is rotatable to change or vary the overall length of the second length 46. Nuts on threaded rods 79 and 81 hold turnbuckle 83 in an adjusted position. Clevis 77 can have a plurality of side-by-side holes to accommodate pin 78 to adjust the overall length of the toggle link trip mechanism. A bar having holes can replace clevis 77.

As shown in FIGS. 3 and 7, a pair of side plates 84 and 86 are connected with nut and bolt assemblies 87 and 88 to a forward end of second member 81. Side plates 84 and 86 have transversely aligned holes 89 and 90 accommodating a control pin 91. Control pin 91 has cylindrical end sections 92 and 93 rotatably located in holes 88 and 89 respectively. Control pin 91 has an enlarged middle eccentric cylindrical section 94 rotatably located in a hole 96 in the rear end of first link 44. Pin 91 is rotated with an arm 97 mounted on a square stub hub 98 projected outwardly from cylindrical end 93. Arm 97 has a square hole 99 accommodating square hub 98 so that rotation of arm 97 will rotate the eccentric cylindrical portion 94. A bolt 101 threaded into hub 98 holds a washer 102 on the end of hub 98 and thereby holds arm 97 in assembled relation with hub 98.

Arm 97 is connected with a long control rod 103 to mount 47. A connecting member 104 is pivotally mounted on the upper end of arm 97 with a pivot pin or bolt 106. Member 104 has a flange containing a hole for accommodating an end of control rod 103. A pair of nuts 107 clamp the control rod 103 to connecting member 104. Nuts 107 are adjustably positioned on rod 103 so the angular position of arm 97 can be adjusted. Control rod 103 has a right angle end 108 located in a bore or hole 109 in the side of mount 47, as shown in FIG. 4. Rod 103 can be directly connected to the outer end of arm 97.

Crank arm of arm 97 is shorter than the crank arm of mount 47. In other words, the distance between pin 91 and pin 106 of arm 97 is shorter than the distance between pin 48 and the end 108 of control rod 103. This relationship causes angular movement of arm 97 which rotates eccentric pin 91, keeping the toggle links under compression or tight when the links are in the down over center position.

Toggle trip mechanism 43 is shown in its down or non-tripped position in FIGS. 1, 3, and 5. When toggle trip mechanism 43 is in the down position the earthworking tool, i.e. moldboard plow bottom 27, is in the normal groundworking position. Pin 91 is located below the horizontal line passing through pivot pins 48 and 78. The offset down distance of the axis of pin 91 relative to the horizontal line passing through pivot pins 48 and 78 is controlled with adjusting stop bolt 73. The normal rearward forces on moldboard plow 27 tends to pivot standard 22 upwardly and rearwardly about the axis of bolt 40. This moves arm 26 in a forward direction placing a compressive force on toggle link trip mechanism 43. With pin 91 below the horizontal plane of the axis, pins 48 and 78, the toggle link trip mechanism functions as the rigid link.

Figure 6:
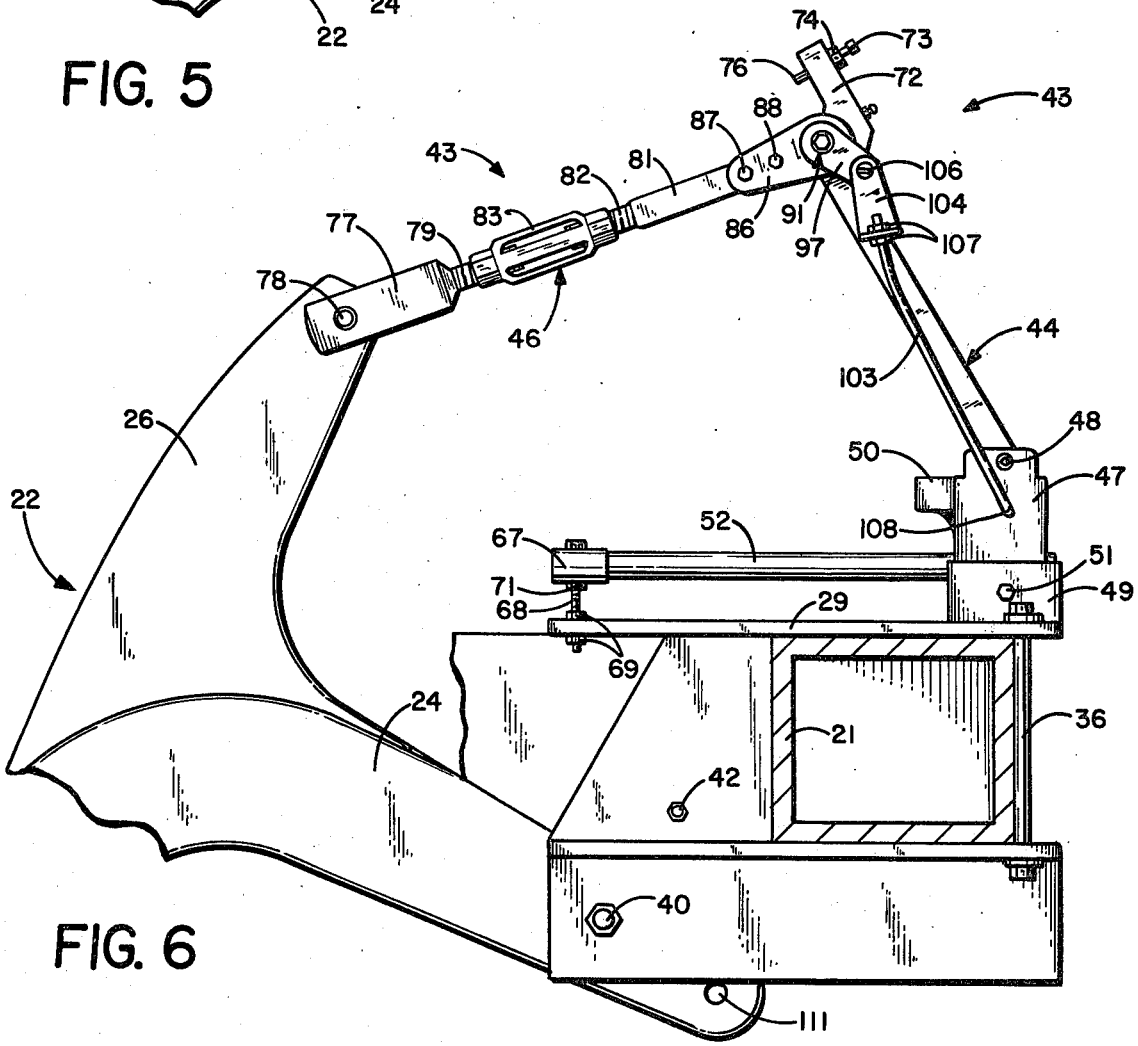
FIG. 6 is a side elevational view of the toggle trip mechanism located in the trip position with the tool in a raised position.

When plow bottom 27 strikes a hard obstruction, such as a rock, the toggle trip mechanism will exert sufficient forward force on the mount 47 to pivot mount 47 in a clockwise or forward direction about pivot pins 51. Control bar 52, being an elongated resilient member yieldably holds mount 47 in an upward position. When sufficient force is applied to mount 47, the control bar 52 will bend allowing mount 47 to pivot on pivot pin 51. The lip 50 moves upward into engagement with link 44 and moves link 44 upwardly until pin 91 is past center. The amount of force required to trip the toggle links can be adjusted by changing the position of bar 52. When bar 52 is lowered the amount of force required to trip the toggle links is increased. When pin 91 moves above the horizontal line between pins 48 and 78 or past center, toggle trip mechanism 43 will collapse to a folded position as shown in FIG. 6. During the folding of the toggle link mechanism 43 plow bottom 27 quickly moves to its raised position since standard 21 pivots about the pin 40.

As soon as plow bottom 27 passes over the obstruction it will return to the normal earthworking position. Plow bottom 27 is returned to the normal earthworking position by raising the plow beam. The weight of the plow bottom pivots the standard 22 until the forward end section 24 engages the stop 41. First and second members 44 and 46 of toggle link mechanism are located in their aligned position with pin 21 below the straight line between pins 48 and 78.

The forward end of standard section 24 has a hole 111. A pin can be placed in hole 111 so that standard 22 will remain in the raised position. This locates the plow bottom 27 above the ground so that the plow share can be removed and replaced with a new plow share.

While there has been shown and described an embodiment of the toggle trip mechanism, it is understood that changes in the structures may be made by those skilled in the art without departing from the invention. The invention is defined in the following claims.

The embodiments of the invention in which an exclusive property or privilege is claimed are defined as follows:

1. An earthworking unit mountable on a beam comprising: a standard having a forwardly directed section, a downwardly directed section and an upright section, a mount assembly adapted to be attached to the beam, means pivotally connecting the forwardly directed section to the mount assembly allowing the standard to pivot between an earthworking position and a trip position, earthworking tool means mounted on the downwardly directed section, and a toggle link trip mechanism for holding the standard in the earthworking position and allowing the standard to move to the trip position when the tool hits an obstruction, said toggle link trip mechanism having a mount, means pivotally connecting the mount to the mount assembly, an elongated flexible control spring connected to the mount to yieldably hold the mount in an upright position, a first link, first pivot means pivotally connecting the first link to the mount, a second link, second pivot means pivotally connecting the second link to the upright section, third pivot means pivotally connecting the first link to the second link, said third pivot means being located in an over center down position when the standard is in its earthworking position and movable to an up position whereby the first and second links fold together when the standard moves from the earthworking position to the trip position, said third pivot means including an eccentric section rotatably mounted on said first link, an arm mounted on the third pivot means to rotate the third pivot means, and a control rod connected to said arm and the mount operable to change the angular position of the arm to adjust the overall length of the first and second links.

2. An earthworking unit mountable on a beam comprising: a standard having a forwardly directed section, a downwardly directed section and an upright section, a mount assembly adapted to be attached to the beam, means pivotally connecting the forwardly directed section to the mount assembly allowing the standard to pivot between an earthworking position and a trip position, earthworking tool means mounted on the downwardly directed section, and a toggle link trip mechanism for holding the standard in the earthworking position and allowing the standard to move to the trip position when the tool hits an obstruction, said toggle link trip mechanism having a mount, means pivotally connecting the mount to the mount assembly, a yieldable control bar connected to the mount to hold the mount in an upright position, a first link, first pivot means pivotally connecting the first link to the mount, a second link, second pivot means pivotally connecting the second link to the upright section, third pivot means pivotally connecting the first link to the second link, said third pivot means being located in an over center down position when the standard is in its earthworking position and movable to an up position whereby the first and second links fold together when the standard moves from the earthworking position to the trip position, said third pivot means including an eccentric section rotatably mounted on said first link, an arm mounted on the third pivot means to rotate the third pivot means, and a control rod connected to said arm and the mount operable to change the angular position of the arm to adjust the overall length of the first and second links, said mount assembly includes a top plate, bottom angle members, and means to clamp the top plate and bottom angle members on the beam.

3. The earthworking unit of claim 2 wherein: the means to clamp the top plate and bottom angle members on the beam include bolts, and eccentric washers rotatably mounted on the top plate and angle members, said washers having holes for accommodating the bolts.

4. An earthworking unit mountable on a beam comprising: a standard having a forwardly directed section, a downwardly directed section and an upright section, a mount assembly adapted to be attached to the beam, means pivotally connecting the forwardly directed section to the mount assembly allowing the standard to pivot between an earthworking position and a trip position, earthworking tool means mounted on the downwardly directed section, and a toggle link trip mechanism for holding the standard in the earthworking position and allowing the standard to move to the trip position when the tool hits an obstruction, said toggle link trip mechanism having a mount, means pivotally connecting the mount to the mount assembly, a yieldable control bar connected to the mount to hold the mount in an upright position, a first link, first pivot means pivotally connecting the first link to the mount, a second link, second pivot means pivotally connecting the second link to the upright section, third pivot means pivotally connecting the first link to the second link, said third pivot means being located in an over center down position when the standard is in its earthworking position and movable to an up position whereby the first and second links fold together when the standard moves from the earthworking position to the trip position, said third pivot means including an eccentric section rotatably mounted on said first link, an arm mounted on the third pivot means to rotate the third pivot means, and a control rod connected to said arm and the mount operable to change the angular position of the arm to adjust the overall length of the first and second links, said mount assembly having a top member, said means pivotally connecting the mount to the mount assembly includes a base secured to the top member, and pivot means pivotally connecting the base to the mount; and means connecting the control bar to the top member.

5. The earthworking unit of claim 1 wherein: the second link has first and second members; and means connected to the first and second members operable to adjust the length of the second link.

6. The earthworking unit of claim 5 wherein: the means connected to the first and second members is a turnbuckle threaded to the first and second members.

7. The earthworking unit of claim 1 including: means cooperating with the control rod for adjusting the length of the control rod.

8. The earthworking unit of claim 1 including: means connecting the spring to the mount assembly.

9. The earthworking unit of claim 1 including: stop means mounted on the first link engageable with the second link to contol the over center location of the third pivot means.

10. The earthworking unit of claim 1 wherein: the mount assembly includes upright plate means located adjacent the forwardly directed section, and stop means mounted on the plate means, said forwardly directed section engaging said stop means when the standard is in the earthworking position.

11. In an earthworking unit having a beam, an earthworking tool, support means for the earthworking tool, means to pivotally mount said support means to said beam about a transverse axis to permit movement of said earthworking tool toward and away from an earthworking position, the improvement comprising: a toggle link trip mechanism for holding the support means in the earthworking position and allowing the support means to move to a trip position when the earthworking tool hits an obstruction, said toggle link trip mechanism having a first link, a second link, first pivot means pivotally connecting the first link to means adapted to be mounted on the beam, second pivot means for pivotally connecting the second link to the support means, third pivot means pivotally connecting the first link to the second link, said third pivot means being located in an over center position when the support means is in the earthworking position and movable to a position away from the over center position whereby the first and second links fold together allowing the support means to move from the earthworking position to the trip position, and means associated with one of the links operable to vary the length of said one link, said third pivot means having an eccentric section rotatably mounted on one of said links, biasing means connected to said movable mount to hold the mount in a first position, said mount being movable to a second position against the biasing force of the biasing means, and control means connecting the third pivot means with the mount to adjust the overall length of the first and second links.

12. The earthworking unit of claim 11 wherein: said one link has first and second members, and means connected to the first and second members operable to adjust the length of said link.

13. The earthworking unit of claim 12 wherein: the means connected to the first and second members is a turnbuckle threaded to the first and second members.

14. The earthworking unit of claim 11 including: stop means mounted on the first link engageable with the second link to control the over center location of the third pivot means.

15. An earthworking unit mountable on a beam comprising: a standard having a forwardly directed section, and a downwardly directed section, a mount assembly adapted to be attached to the beam, means pivotally connecting the forwardly directed section to the mount assembly allowing the standard to pivot between an earthworking position and a trip position, earthworking tool means mounted on the downwardly directed section, and a toggle link trip mechanism for holding the standard in the earthworking position and allowing the standard to move to the trip position when the tool hits an obstruction, said toggle link trip mechanism having a mount, means pivotally connecting the mount to the mount assembly, an elongated flexible control bar spring connected to the mount to yieldably hold the mount in an upright position, a first link, first pivot means pivotally connecting the first link to the mount, a second link, second pivot means pivotally connecting the second link to the standard, third pivot means pivotally connecting the first link to the second link, said third pivot means being located in an over center down position when the standard is in its earthworking position and movable to an up position whereby the first and second links fold together when the standard moves from the earthworking position to the trip position, said mount assembly having a top member, said means pivotally connecting the mount to the mount assembly including a base secured to the top member, and pivot means pivotally connecting the base to the mount, and means connecting the control bar spring to the top member.

16. The earthworking unit of claim 15 including: stop means mounted on the first link engageable with the second link to control the over center location of the third pivot means.

17. The earthworking unit of claim 15 wherein: said mount assembly includes upright plate means located adjacent the forwardly directed section of the standard, and stop means mounted on the plate means, said forwardly directed section of the standard engageable with the stop means when the standard is in an earthworking position.

18. The earthworking unit of claim 15 wherein: said mount assembly includes bottom members, and means to clamp the top plate and bottom members on the beam.

19. The earthworking unit of claim 18 wherein: the means to clamp the top plate and the bottom members on the beam includes bolts and eccentric washers rotatably mounted on the top plate and bottom members, said washers having holes for accommodating the bolts.

20. The earthworking unit of claim 15 including: means on the mount engageable with the first link to move the first and second links from the over center position toward the folded position in response to movement of the mount when the tool means engages an obstruction.

21. An earthworking unit mountable on a beam comprising: a standard having a forwardly directed section, and a downwardly directed section, a mount assembly adapted to be attached to the beam, means pivotally connecting the forwardly directed section to the mount assembly allowing the standard to pivot between a down earthworking position and an up trip position, earthworking tool means mounted on the downwardly directed section, and a toggle link trip mechanism for holding the standard in the earthworking position and allowing the standard to move from the earthworking position of the trip position when the tool means hits an obstruction, said toggle link trip mechanism having a mount, means pivotally connecting the mount to the mount assembly, spring means operably connected to the mount and mount assembly to yieldably hold the mount in a position, a first link, first pivot means pivotally connecting the first link to the mount, a second link, second pivot means pivotally connecting the second link to the standard, third pivot means pivotally connecting the first link to the second link, said third pivot means being located in an over center down position when the standard is in its earthworking position and movable to an up position whereby the first and second links fold together when the standard moves from the earthworking position to the trip position, said mount having a top member, said means pivotally connecting the mount to the mount assembly including means secured to the top member, and pivot means pivotally connecting the mount to the means secured to the top member, and means mounting the spring means on the top member.

22. The earthworking unit of claim 21 including: stop means mounted on the first link engageable with the second link to control the over center location of the third pivot means.

23. The earthworking unit of claim 21 wherein: said mount assembly includes upright plate means located adjacent the forwardly directed section of the standard, and stop means, said forwardly directed section of the standard engageable with the stop means when the standard is in an earthworking position.

24. The earthworking unit of claim 21 wherein: said mount assembly includes bottom members, and means to clamp the top plate and bottom members on the beam.

25. The earthworking unit of claim 24 wherein: the means to clamp the top plate and bottom members to the beam includes bolt and eccentric washers rotatably mounted on the top plate and bottom members, said washers having holes for accommodating the bolts.

26. The earthworking unit of claim 21 including: means on the mount engageable with the first link operable in response to movement of the mount to move the first and second links from their down over center position toward the up folded position.

27. The earthworking unit of claim 21 wherein: the spring means includes elongated flexible control bar means, said means mounting the spring means on the top member including means connected to one end portion of the control bar means.

28. The earthworking unit of claim 21 wherein: the means mounting the spring means on the top member includes means to adjust the position of the spring means relative to the top member.

* * * * *

UNITED STATES PATENT AND TRADEMARK OFFICE
CERTIFICATE OF CORRECTION

PATENT NO. : 4,167,977

DATED : September 18, 1979

INVENTOR(S) : Cletus J. Geurts

It is certified that error appears in the above-identified patent and that said Letters Patent are hereby corrected as shown below:

Column 2, line 52, "Plow bottom unit 21" should be --Plow bottom unit 20--.

Column 4, line 30, "link 43" should be --link 46--.

Column 9, line 41, "of" should be --to--.

Signed and Sealed this

Eleventh Day of December 1979

[SEAL]

Attest:

SIDNEY A. DIAMOND

Attesting Officer

Commissioner of Patents and Trademarks